US007020497B2

(12) United States Patent
Deeds

(10) Patent No.: US 7,020,497 B2
(45) Date of Patent: Mar. 28, 2006

(54) PROGRAMMING MULTIPLE RINGING TONES OF A TERMINAL

(75) Inventor: Douglas Deeds, Fort Worth, TX (US)

(73) Assignee: Nokia Corporation, Espoo (FI)

( * ) Notice: Subject to any disclaimer, the term of this patent is extended or adjusted under 35 U.S.C. 154(b) by 451 days.

(21) Appl. No.: 10/154,160

(22) Filed: May 23, 2002

(65) Prior Publication Data

US 2004/0204146 A1 Oct. 14, 2004

(51) Int. Cl.
*H04Q 7/20* (2006.01)

(52) U.S. Cl. ................. 455/567; 455/414.1; 455/412.2

(58) Field of Classification Search ................ 455/567, 455/550.1, 412.2, 414.1; 379/373.01, 373.02, 379/374.01, 418, 375.01, 67.1, 911, 373.04, 379/373.03, 374.02
See application file for complete search history.

(56) References Cited

U.S. PATENT DOCUMENTS 5,452,354 A * 9/1995 Kyronlahti et al. .... 379/373.02
5,881,147 A * 3/1999 Kim ...................... 379/373.03
6,094,587 A * 7/2000 Armanto et al. ............ 455/567
6,308,086 B1 * 10/2001 Yoshino ..................... 455/567
6,366,791 B1 * 4/2002 Lin et al. .................... 455/567
6,418,330 B1 * 7/2002 Lee ............................ 455/567
6,501,967 B1 * 12/2002 Makela et al. ............. 455/567

* cited by examiner

*Primary Examiner*—Jean Gelin
(74) *Attorney, Agent, or Firm*—Steven A. Shaw; Ariun Krishnan; Alston & Bird LLP

(57) ABSTRACT

A terminal adapted to communicate via a communications system includes a memory capable of storing a plurality of ringing tones, where the plurality of ringing tones includes at least one set of at least two ringing tones associated with at least one event. The terminal also includes a controller capable of choosing a ringing tone from the set(s) of ringing tones based upon a predefined selection criteria, such as based upon a random search criteria or a sequential search criteria. The controller is further capable of generating signals directed to an output reproduction device that is capable of generating the chosen ringing tone in response to the terminal receiving an event associated with the at least one set of ringing tones including the chosen ringing tone.

14 Claims, 9 Drawing Sheets

PROGRAMMING MULTIPLE RINGING TONES OF A TERMINAL

FIELD

The present invention relates generally to terminals such as mobile telephones and, more particularly, relates to programming multiple ringing tones of a terminal for output in response to an event.

BACKGROUND

Conventional terminals, such as mobile telephones, have a detectable output, such as ringing tones, ringing tunes or the like, similar to ordinary telephones, which have mainly resembled the ringing of a clock. When a mobile phone of a specific make and model had one fixed ringing tone, however, problematic situations occurred. In this regard, when two users in the same space have the same type of mobile phone and, thus, the same kind of ringing tone, it can be confusing as to whose phone is actually ringing. This source of confusion has been ameliorated by making the ringing tone dependent on either the user's own telephone number or the telephone number of a caller. However, the ringing tones produced on the basis of two almost identical telephone numbers may sound so much alike, that it is difficult to distinguish one ringing tone from the other.

Further improvements to providing more distinguishable ringing tones have been made as mobile phones have become more advanced. Currently, mobile phones normally have several pre-stored ringing tones from which the user can select a preferred ringing tone. In addition to ordinary ringing tones, melodies from familiar pieces of music have been implemented as ringing tones from which a user may select. With the enormous increase in the use of mobile phones, it has turned out that even as many as ten different programmed ringing tones are sometimes not enough to satisfy mobile phone users. This situation has been improved by enabling ringing tones to be programmed by the user via the user interface of the telephone or other communication device. One technique has been presented in U.S. Pat. No. 4,866,766, where a user can input different kinds of parameters, which define a pulsed ringing tone sequence having parameters such as frequency, pulse length, the number of pulses in a group, period between pulses, the number of pulse groups, etc. Another technique for programming a ringing tone has been presented in Finnish Patent Application No. 960858, published Aug. 24, 1997, wherein it is possible to program a ringing tone as notes by inputting the notes graphically on a stave that is displayed on a display.

Another technique for programming a ringing tone utilizes the Internet, where Web sites exist from which users can download ringing tones, such as popular music, to their mobile phones. Such programming, however, generally requires the user to have access to a personal computer or other Internet device using browsers that support basic industry standards such as Hypertext Transfer Protocol (HTTP) and Hypertext Mark-up Language (HTML). In this regard, recent developments in Internet protocols have resulted in the creation of the Wireless Application Protocol (WAP) specification. The WAP specification, in turn, operates according to the Handheld Device Markup Language (HDML) or Wireless Markup Language (WML), and allows Internet content to be adapted for use on narrow bandwidth and limited screen size handheld devices such as mobile phones. Mobile phone manufacturers are currently beginning to embed high-value added applications such as WAP compliant micro-browsers in mobile phones that allow the mobile phones to function as a client for services and content from the Internet through a wireless portal. Thus, Web sites are beginning to offer ringing tones that can be delivered to mobile phones via WAP or other similar services.

Although a number of ringing tone programming techniques have been proposed, the programming of ringing tones through a user interface or utilizing the Internet has its disadvantages. Among the disadvantages is the fact that once a user has selected a particular ringing tone, the user must manually change the ringing tone each time the user desires to select a different ringing tone, such as by accessing a profile, accessing ringing tone settings and thereafter searching and selecting a different ringing tone. Thus, some users will select a ringing tone and then rarely alter the selected ringing tone, even though they grow somewhat tired of the selected ringing tone.

SUMMARY

In light of the foregoing background, the present invention provides an improved terminal and method of generating a ringing tone in response to a predefined event, such as an incoming telephone call. According to the present invention, the ringing tone is chosen from at least one set of ringing tones based upon a predefined selection criteria, where the sets of ringing tones are associated with events, such as an incoming call, page, etc. The chosen ringing tone is then generated in response to the terminal receiving an event of the type associated with the at least one set of ringing tones including the chosen ringing tone. For example, a set of two or more ringing tones can be associated with incoming calls to the terminal such that when an incoming call is received by the terminal, one of the ringing tones of the set is chosen and thereafter generated in response to the incoming call. In this regard, a wide variety of different ringing tones can be generated as different ringing tones of the set are chosen in response to subsequent events, thereby allowing the user to hear different ringing tones without requiring the user to manually change the ringing tone each time the user desires to select a different ringing tone. As such, the terminal and method of the present invention solve the problems identified by prior techniques and provide additional advantages.

According to one embodiment, a terminal adapted to communicate via a communications system includes a memory capable of storing a plurality of ringing tones, where the plurality of ringing tones includes at least one set of at least two ringing tones that is associated with at least one event. In this regard, the terminal can also include a user interface capable of receiving selections of at least two ringing tones from a plurality of ringing tones to thereby define the set(s) of ringing tones. The terminal also includes a controller capable of choosing a ringing tone from the set of ringing tones based upon a predefined selection criteria, such as based upon a random search criteria or a sequential search criteria. The controller is further capable of generating signals directed to an output reproduction device that is capable of generating the chosen ringing tone in response to the terminal receiving an event associated with the at least one set of ringing tones including the chosen ringing tone.

The terminal can choose another ringing tone from the set of ringing tones after the output reproduction device generates the ringing tone that was previously chosen by said controller. In this regard, the other ringing tone can be different from the ringing tone that was previously chosen by said controller. Also, as the terminal can receive another event, the controller can generate signals directed to the output reproduction device in response to the terminal receiving the another event such that the output reproduction device generates the other ringing tone.

According to another embodiment, at least one set of ringing tones is associated with an event originating with at least one identifiable source. In this embodiment, the controller is capable of determining information regarding an event originating with the identifiable source. The controller can then generate signals directed to the output reproduction device such that the output reproduction device can generate the chosen ringing tone in response to the terminal receiving an event originating with the identifiable source as determined from the information regarding the event.

The terminal and method of the present invention therefore associate sets of ringing tones with different events without requiring manual intervention from the user to change ringing tones upon receipt of different events. In this regard, any number of different ringing tones can be output by the terminal in response to the terminal receiving an event, such as an incoming call. Further, the ringing tones generated by the terminal and method of the present invention can be capable of identifying attributes associated with the respective event, such as by associating one or more sets of ringing tones with information regarding an incoming call.

BRIEF DESCRIPTION OF THE DRAWINGS

Figure 1:
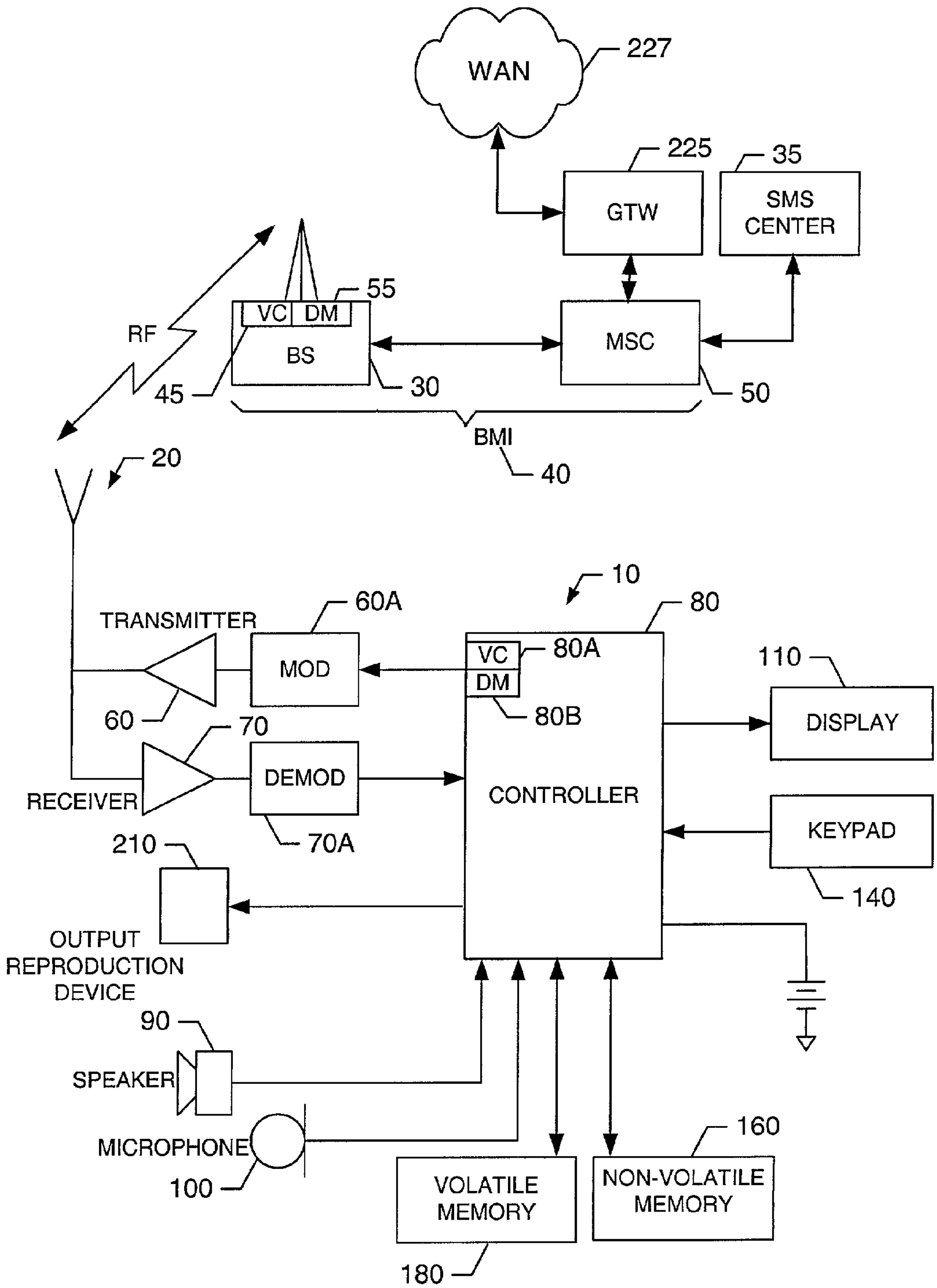
Figure 2:
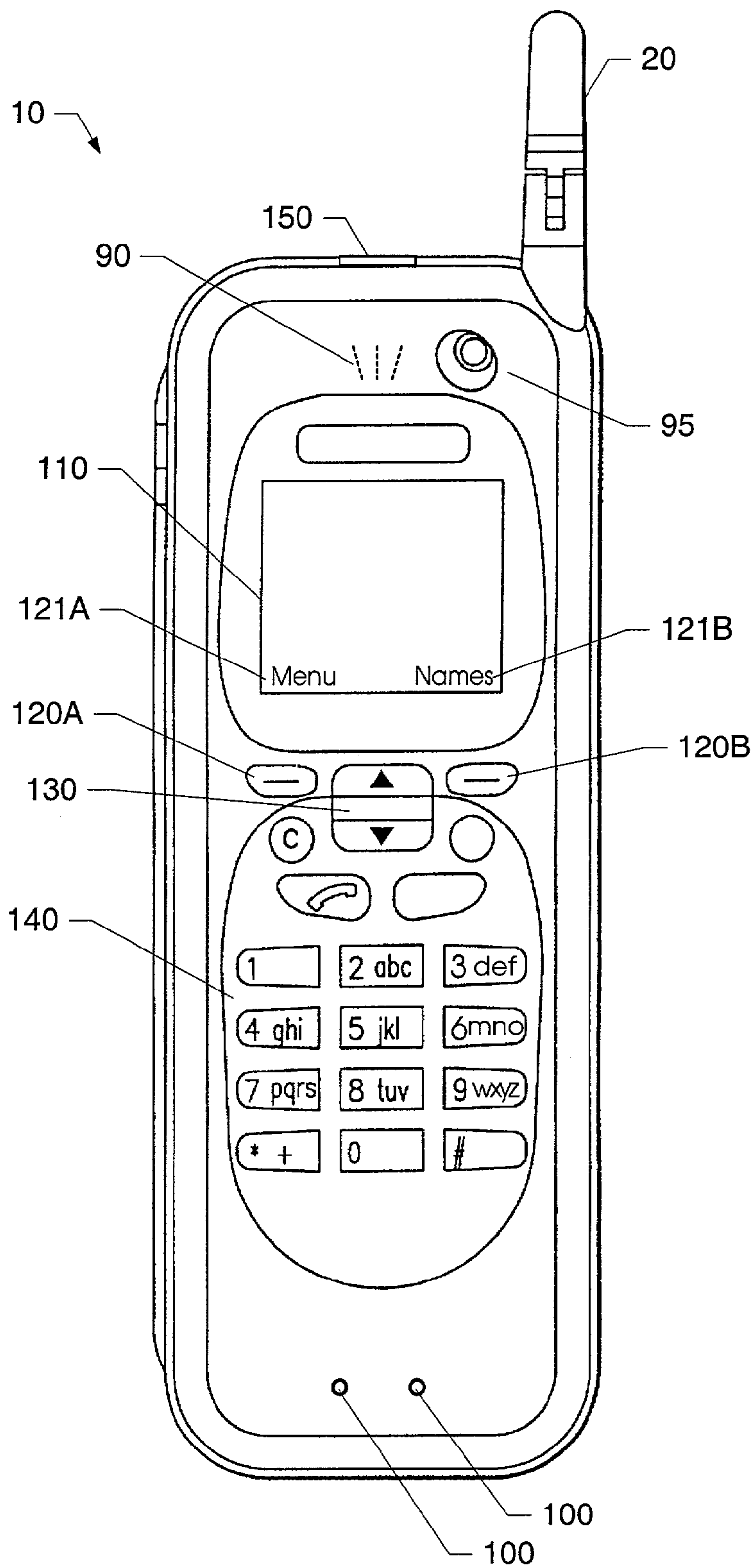
Figure 3:
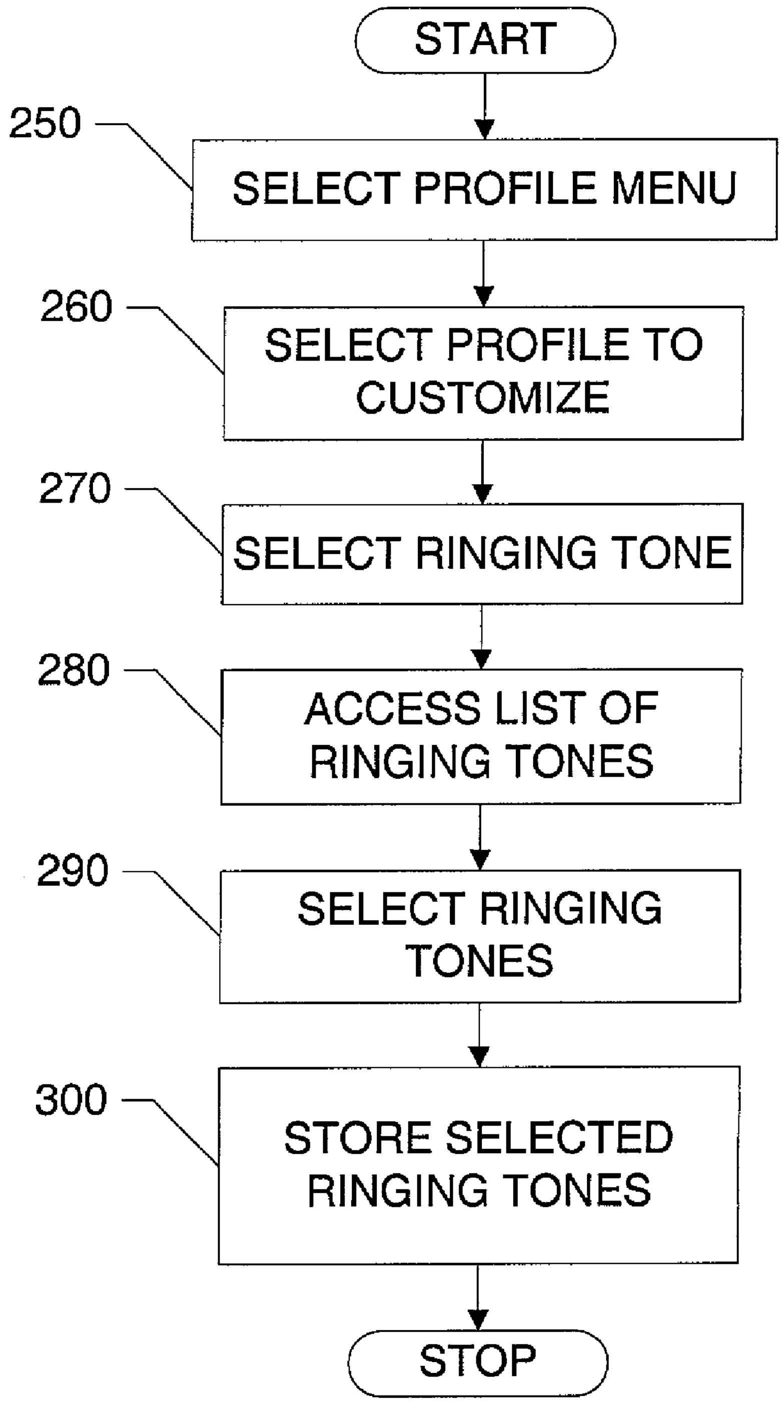
Figure 5:
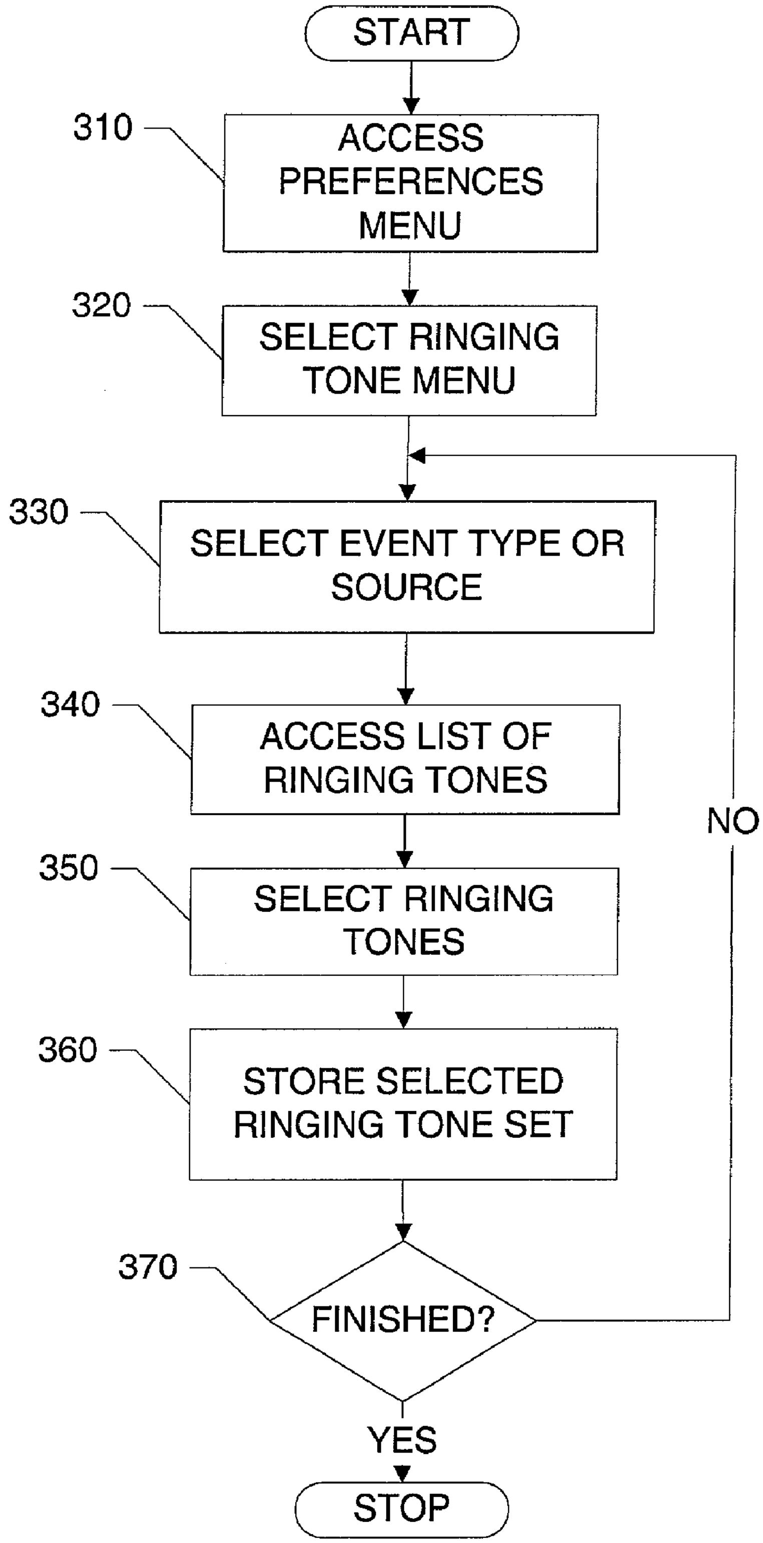
Figure 7:
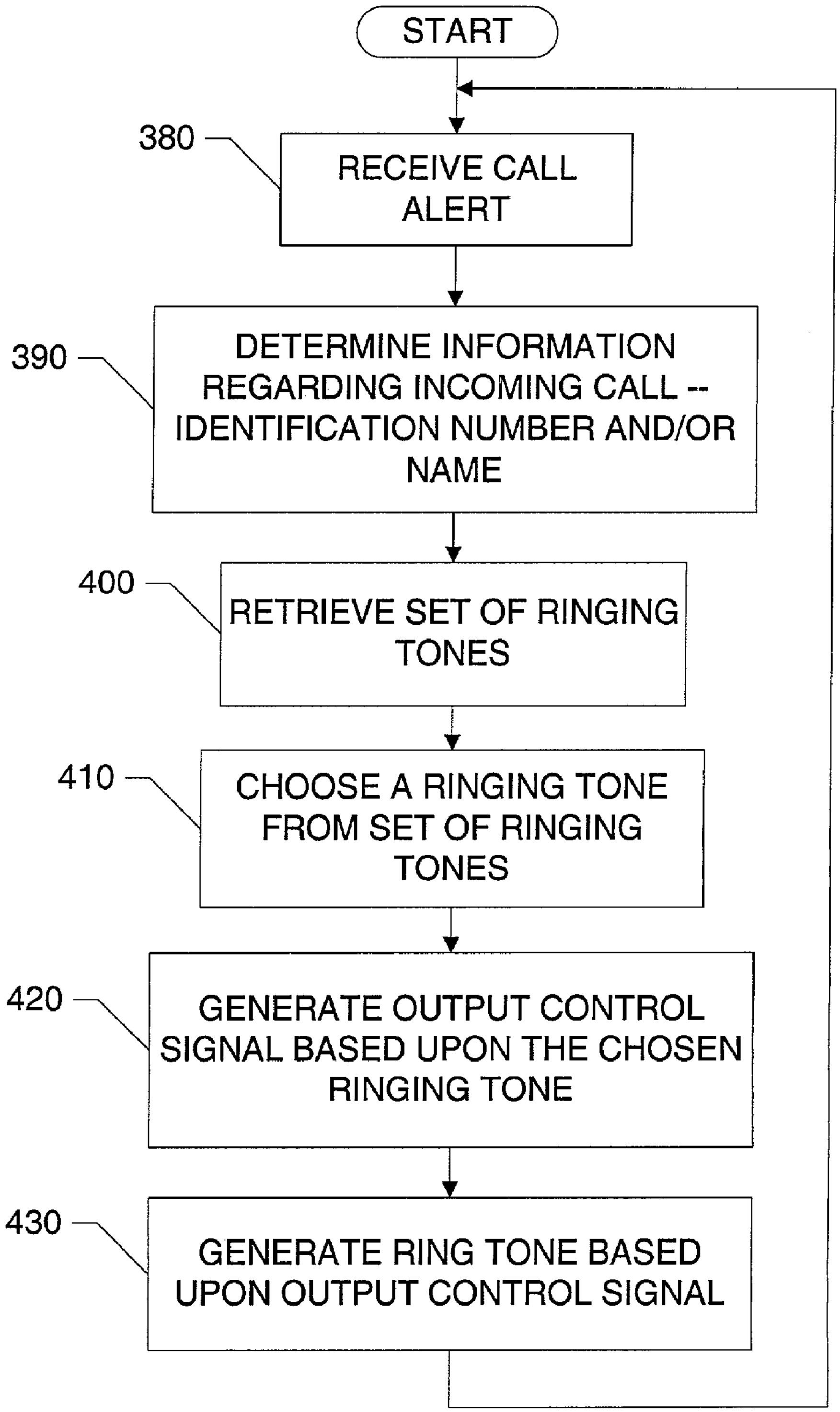
Figure 8:
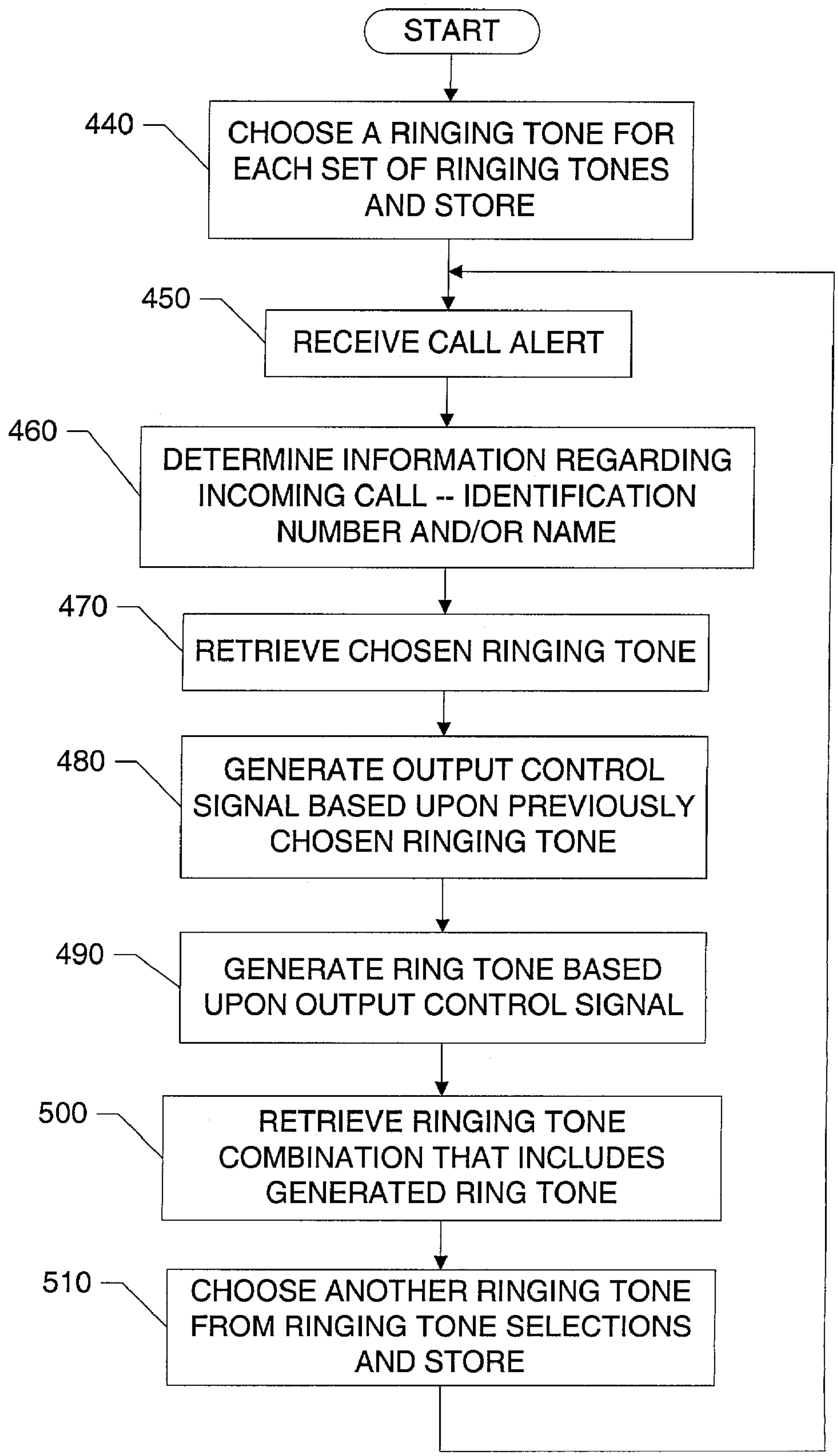

Having thus described the invention in general terms, reference will now be made to the accompanying drawings, which are not necessarily drawn to scale, and wherein:

FIG. 1 is a block diagram of a mobile communications system according to one embodiment of the present invention including a mobile station and a Base Station/MSC/Interworking function (BMI) to which the mobile station is bidirectionally coupled through wireless RF links;

FIG. 2 is a schematic diagram of a mobile station according to one embodiment of the present invention;

FIG. 3 is a flowchart illustrating various steps in a method for programming multiple ringing tones according to one embodiment of the present invention;

FIGS. 4A–4G are block diagrams highlighting the display of a mobile station at various stages in the method for programming multiple ringing tones according to one embodiment of the present invention;

FIG. 5 is a flow chart illustrating various steps in a method for programming multiple ringing tones according to another embodiment of the present invention;

FIGS. 6A–6E are block diagrams highlighting the display of a mobile station at various stages in the method for programming multiple ringing tones according to another embodiment of the present invention;

FIG. 7 is a flowchart illustrating various steps in a method for generating a ringing tone from a mobile station according to one embodiment of the present invention; and FIG. 8 is a flowchart illustrating various steps in a method for generating a ringing tone from a mobile station according to another embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, an illustration of one type of terminal, a mobile station, that would benefit from the present invention is provided. It should be understood, however, that the mobile telephone illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of terminals, such as landline telephones, pagers, and other types of voice and text communications systems, can readily employ the present invention. Moreover, the system, terminal and method of the present invention will be primarily described in conjunction with mobile communications applications. But the system, terminal and method of the present invention can be utilized in conjunction with a variety of other applications, both in the mobile communications industries and outside of the mobile communications industries.

As shown, the mobile station 10 includes an antenna 20 for transmitting signals to and for receiving signals from a base site or base station (BS) 30. The base station is a part of a cellular network that includes a mobile switching center (MSC) 50, an SMS center 35, voice coder/decoders (vocoders) (VC) 45, data modems (DM) 55, and other units required to operate the network. The MSC is capable of routing calls and messages to and from the mobile station when the mobile station is making and receiving calls. The MSC also provides a connection to landline trunks when the mobile station is involved in a call. Further, the MSC can be connected to a server GTW 225 (Gateway), which is in connection with a wide area network (WAN) 227, such as the Internet. As was indicated above, the cellular network may also be referred to as a Base Station/MSC/Interworking function (BMI) 40.

The mobile station includes a modulator (MOD) 60A, a transmitter 60, a receiver 70, a demodulator (DEMOD) 70A, and a controller 80 that provides signals to and receives signals from the transmitter and receiver, respectively. These signals include signaling information in accordance with the communications standard of the applicable cellular system, and also user speech and/or user generated data. For example, the communications standard can comprise the Global System for Mobile (GSM) communications standard, the Code Division Multiple Access (CDMA) communications standard or any of their progeny and the like. The mobile station may also be configured to meet the wireless application protocol (WAP) specification.

It is understood that the controller 80 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 80A, and may include an internal data modem (DM) 80B.

The mobile station 10 also comprises a user interface that includes a conventional earphone or speaker 90, a conventional microphone 100, a display 110, and a user input interface, all of which are coupled to the controller 80. The mobile station also includes a battery 115, such as a vibrating battery pack, for powering the various circuits that are required to operate the mobile station, as well as optionally providing mechanical vibration as a detectable output, as described below. The display can present any of a number of different displays, such as data and menus. The display can also display areas for softkey functions 121A and 121B that can be activated by pressing softkeys 120A and 120B, respectively. The user interface can also include a scroll element to scroll through menu items featured on the display. The scroll element can comprise any of a number of known devices that allow for scrolling through displayed items, including a rolling cylinder, ball or the like. In the illustrated embodiment, however, the scroll element comprises scroll keys 130.

The mobile station 10 also includes a user input interface, which allows the mobile station to receive data. The user input interface can comprise any of a number of devices allowing the mobile station to receive data, such as a keypad 140, a touch display (not shown) or other input device. In embodiments where the user input interface comprises a keypad, the keypad includes the conventional numeric (0–9) and related keys (#, *), and other keys used for operating the mobile station. In addition to the softkeys 120A and 120B, the other keys may include, for example, a SEND key, various menu scrolling keys and a PWR key. Additionally, the keys of the keypad may be illuminated by various methods known to those skilled in the art to produce a visual reminder in response to an event. For one such method of illuminating the keys of the keypad, see U.S. patent application Ser. No. 09/887,127, entitled: Communications Device, filed Jun. 22, 2001 and published as U.S. Publication No. 2002/0019248 A1.

The mobile station 10 can also be provided with an interface (not shown) to allow the audio of the mobile station, including the ring tunes, to be played over an existing audio system. By including the interface, the mobile station can provide a more elaborate speaker and/or ringer system that will allow the mobile station to play polyphonic tunes. Such an interface is described in U.S. Pat. No. 6,163,711 entitled: Method and Apparatus for Interfacing a Mobile Phone with an Existing Audio System issued Dec. 19, 2000 to Juntunen et al.

Mobile station 10 can further include an infrared transceiver 150 or other means of data transfer so that data can be shared with other devices such as other mobile stations, car guidance systems, personal computers, printers and the like. The sharing of data, as well as the remote sharing of data, can also be provided according to a number of different techniques. For example, the mobile station may share data via a Radio Frequency Identification (RFID) transponder tag, as such is known to those skilled in the art. Additionally, or alternatively, the mobile station may share data using Bluetooth brand wireless technology developed by the Bluetooth Special Interest Group.

To store data upon receipt from the various sources, the mobile station includes volatile memory 180, such as volatile Random Access Memory (RAM) including a cache area for the temporary storage of data. The mobile station can also include non-volatile memory 160, which can be embedded and/or may be removable such as a removable Subscriber Identification Module (SIM). The non-volatile memory can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile station to implement the functions of the mobile station. For example, the memories, and particularly the non-volatile memory, can include a directory or listing of telephone numbers, as well as a name associated with each of the telephone numbers. The memories can also include computer program products that control the operation of all or a portion of the controller 80 to thereby implement the present invention. The controller, which can include embedded cache memory, generates appropriate commands and controls the other component blocks of the mobile station.

In operation, in response to an event, such as an incoming call, a short message, a page or the like, the mobile station 10 receives an event alert, such as a call alert. For example, when the event comprises an incoming call, the base station 30 acts as an intermediary between a device calling the mobile station, such as a landline or mobile telephone, by sending a call alert to the mobile station, to which the controller responds by sending the output control signal to an output reproduction device 210. In response to, and based upon, the output control signal, the output reproduction device generates a detectable output, such as in a human perceptible form including, for example, ringing tones or other audible sounds, and/or mechanical vibration, light illumination of all or a portion of the mobile station or other detectable physical indications.

The output reproduction device can include any of a number of known devices within the mobile station, such as a ringer 95, a vibrating battery pack, a light source and/or any other device capable of providing a human perceptible output. Additionally, or alternatively, the output reproduction device can include any of a number of devices located at a distance from the mobile station 10, such as a remote audio system. In this regard, the output control signal can be transmitted from the mobile station via the infrared transceiver 150 or other means of data transfer (e.g., Bluetooth brand wireless technology). And upon reception by the device located at a distance from the mobile station, the output reproduction device of this embodiment responds to the output control signal by generating the detectable output.

It will be appreciated that although as illustrated and described herein the controller 80 sends the output control signal directly to the output reproduction device 210, the mobile station 10 can include an event indicator, such as a call indicator, intermediate the controller and the output reproduction device. In such an instance, the controller sends the output control signal to the event indicator which, in turn, passes the output control signal to the output reproduction device. Further, the event indicator typically includes a sound generator that generates the ringing tones according to a predefined sequence in response to an event, such as an incoming call. The sequence of the ringing tones is generally generated from the output control signal sent from the controller, which produces the output control signal by reading, from the memory 160, the ringing tone or ringing tone parameters stored therein. Thus, the output control signal contains the information for the sound generator of the event indicator that defines the ringing tone that the sound generator generates for the output reproduction device 210.

Hereinafter the detectable output will be described in terms of ringing tones provided by the ringer, but it should be understood that the following description can equally apply to mechanical vibration and/or light illumination of all or a portion of the mobile station or other detectable physical indications without departing from the spirit and scope of the present invention. Also, it should also be understood that, as used herein, the term ringing tones includes any one of a number of different types of audible outputs, including monotone or polyphonic ringing tones, ringing tunes or the like. In this regard, as used by those skilled in the art, the terms ringing tones and ringing tunes may be used interchangeably. Further, although an event received by the mobile station may be described herein as comprising an incoming call, it should be understood that the event can equally comprise any of a number of known events received by a mobile station, such as an incoming call, a short message, a page or the like.

When the event comprises an incoming call, the call alert can include caller identification information about the device calling the mobile station 10 and/or the caller operating the calling device. The call alert can include any of a number of different known caller identification information that includes an identification number and/or name associated with the calling device or caller operating the calling device, as such is known. For example, the caller identification information can comprise Automatic Number Identification (ANI), Caller ID, Caller Line Identification (CLI) and/or Calling Name Identification (CNAM). Thus, upon receipt of the call alert, in addition to activating the event indicator, the controller 80 can also display the caller identification information, as described below, on the display 110.

As is known to those skilled in the art, all or portions of caller identification information can be blocked or may otherwise be unavailable. Thus, if the base station 30 only forwards an identification number to the mobile station, as opposed to both the identification number and name, a name associated with the identification number can thereafter be determined locally by the mobile station. In this regard, the mobile station 10 can have stored in memory, such as non-volatile memory 160, selected identification numbers and associated names, such as in an electronic directory. Thus, upon receipt of the identification number in the call alert, the controller can determine a name associated with the identification number by querying the memory within which the identification numbers and names are stored. Also, even if the base station forwards the identification number and an associated name, the controller can replace the name received with a name associated with the identification number stored in memory in the event that the information stored in memory conflicts with the name received. As such, the mobile station can define names for select identification numbers differently than the names otherwise transmitted with the identification numbers.

As stated, in response to an event, the output reproduction device 210 generates a sequence of ringing tones. In some instances, however, it is desirable for the output reproduction device of the mobile station 10 to generate one of the ringing tones in response to an event, and generate different ringing tones in response to subsequent events, in contrast to requiring the user to manually select a different ringing tone. In this regard, the user may desire to program multiple ringing tones in advance and to arrange the multiple ringing tones into one or more sets that are associated with respective events. Thus, the controller 80 can choose different ringing tones from the appropriate set of pre-programmed ringing tones for output by the output reproduction device in response to an event. By so programming the ringing tone, the mobile station can output any one of a number of different ringing tones in response to events received by the mobile station, thereby advantageously increasing the variety of ringing tones.

As shown in FIGS. 3 and 4, a method of programming multiple ringing tones of a mobile station begins by initializing the programming of the ringing tones. Initialization can be accomplished in any one of a number of manners but, in one embodiment, is accomplished by selecting a profile menu and thereafter selecting a profile to customize, such as a user-defined profile (e.g., "Britney"), as shown in blocks 250 and 260 of FIG. 3 and FIGS. 4A and 4B. As used herein, selections can be made in any one of a number of different manners, such as by depressing or otherwise actuating a softkey 120 of the keypad 140 associated with an appropriate softkey function 121, such as "Select." From the profile, then, the user can select to customize the ringing tone, as illustrated in block 270 of FIG. 3 and FIG. 4C. It should be understood that the displays illustrated in FIG. 4 can be implemented in a mobile station with a larger display or, equally, can be implemented on a display of the size of an ordinary mobile station, e.g., on a matrix-type liquid crystal display. After selecting to customize the ringing tone, the user can be presented with a display of a currently selected ringing tone associated with the selected profile. For example, as shown in FIG. 4D, the display 110 can present the currently selected ringing tone as a song title, such as the song entitled "I'm a Slave 4 U." Alternatively, and in accordance with the present invention, if the currently selected ringing tone is to comprise more than one ringing tone, the user can be presented with an indication of such multiple selected ringing tones, such as by displaying "Multiple," as shown in FIG. 4E.

Figure 4A:
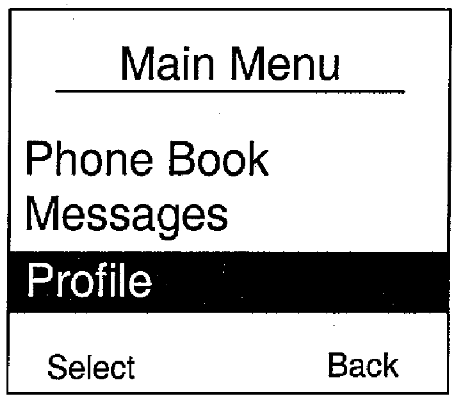
Figure 4B:
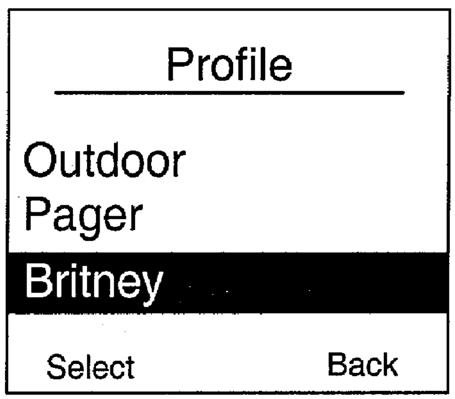
Figure 4C:
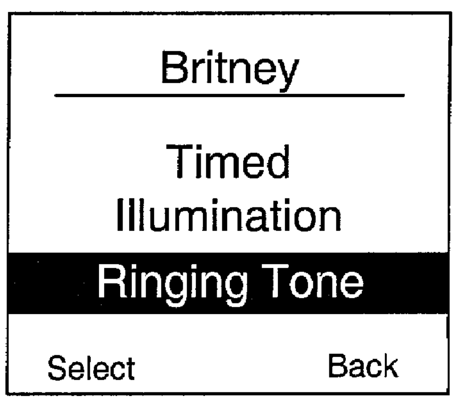
Figure 4D:
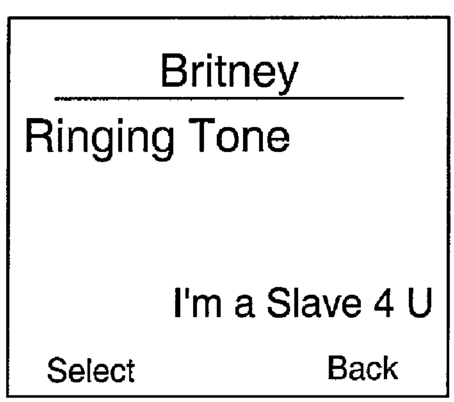
Figure 4E:
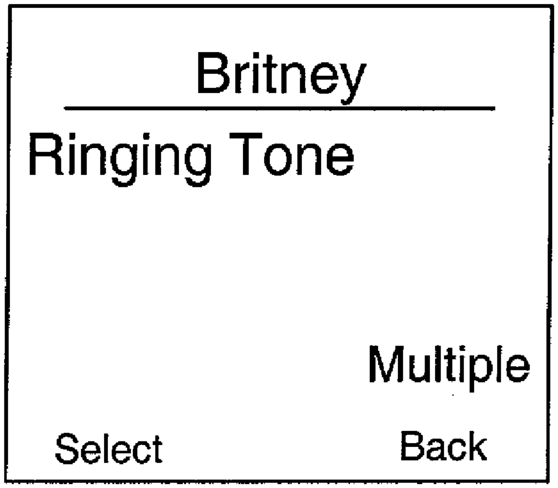
Figure 4F:
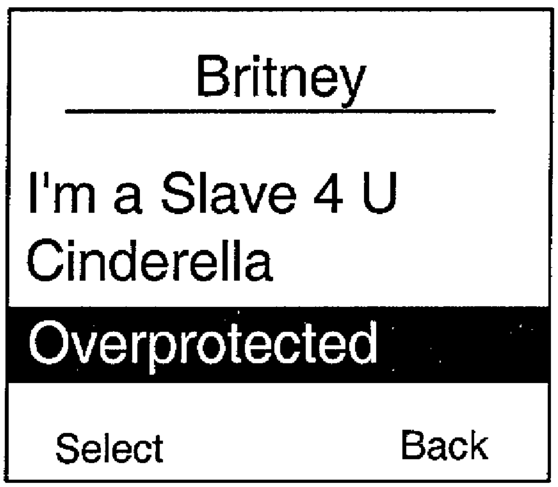
Figure 4G:
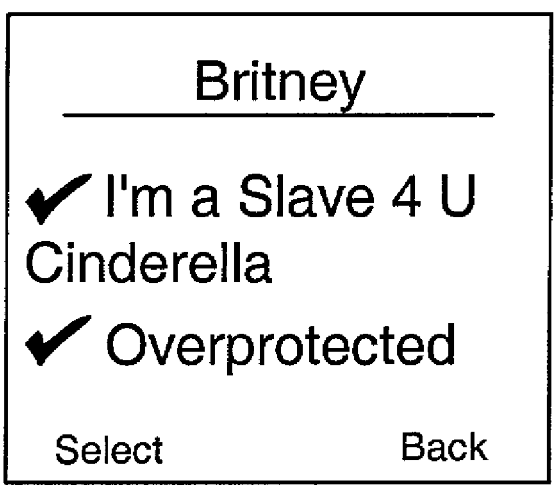

To program the ringing tone differently than the current selected ringing tone or ringing tones such as by adding to or subtracting from the ringing tones previously selected, the user accesses a list of ringing tones stored in memory, such as non-volatile memory 160, as shown in block 280 of FIG. 3 and FIG. 4F. The list of ringing tones can include any of a number of different stored ringing tones but, in one embodiment, includes ringing tones previously transmitted or downloaded into the mobile station, such as from the Internet via the WAP specification. From the list of ringing tones, the user can select one or more ringing tones, as illustrated in block 290 of FIG. 3 and FIG. 4G. The selected ringing tones can be identified on the display 110, and can be identified in any one of a number of manners, such as by underlining, highlighting, checking (shown), or the like. As shown in block 300 of FIG. 3, after all of the desired ringing tones have been selected, the controller 80 can save an indication of the set of ringing tones into memory, such as in a preference table associated with the profile in non-volatile memory 160.

The set of ringing tones will be associated with an event such that the event will trigger one of the ringing tones to be output. In the foregoing example in which a single set of ringing tones is defined, the set of ringing tones will generally be associated with all events. Thus, all events will trigger the selection and output of one of the ringing tones in the preference table. In lieu of establishing a set of ringing tones that will be output in response to all events, different sets of ringing tones can be defined and associated with different events receivable by the mobile station 10. For example, the different events can include different types of events such as incoming calls, short messages, pages or the like. Thus, the ringing tone would be selected from different sets of ringing tones as different types of events occur.

Additionally, or alternatively, the different events can be the same type of event, albeit from a different source. The sources can be any of a number of different sources identifiable by the mobile station. For example, the identifiable sources can be those associated with entries in a directory stored in memory, such as non-volatile memory 160 and/or a removable SIM. The identifiable sources can also be derived from caller identification information including identification numbers (e.g., telephone numbers) and/or names receivable by the mobile station. While an identifiable source can be specific telephones that place a call to the mobile station 10, the identifiable source can be a group or other collection of individual sources. In this regard, the identified sources can include all telephone numbers in a particular area code, prefix, and/or extension. In this regard, a particular set of ringing tones, such as different songs by John Denver, can be programmed for incoming calls from telephone numbers having the area code "303," which corresponds to calls originating from Denver, Colo. Also, for example, the identifiable sources can include name information, including a particular last name and/or first name, or for names (last or first) beginning with a particular letter of the alphabet.

Figure 6A:
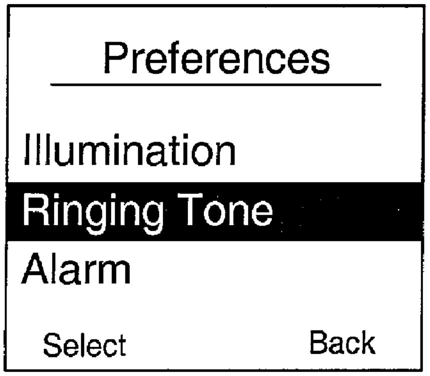
Figure 6B:
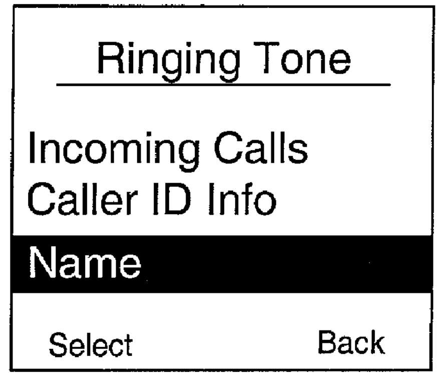
Figure 6C:
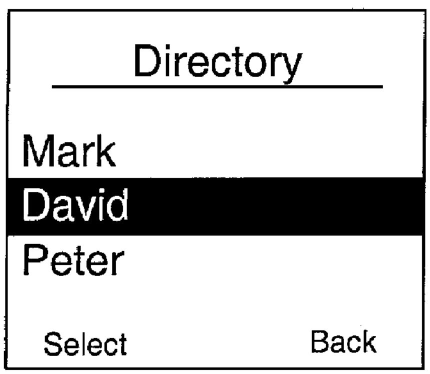
Figure 6D:
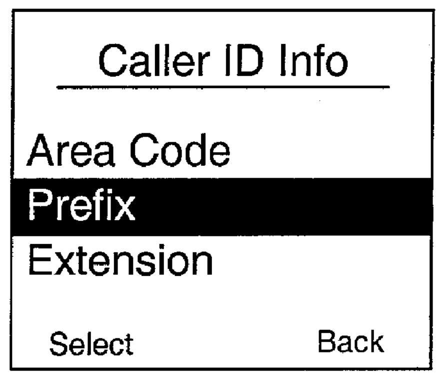
Figure 6E:
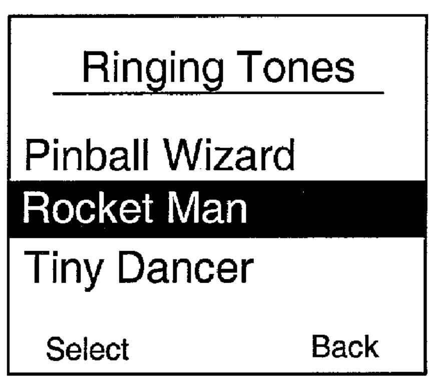

Whereas multiple ringing tones can be programmed for different events in any one of a number of manners, according to one embodiment, the user can program the ringing tones by first accessing a preference menu, as illustrated in block 310 of FIG. 5. From the preference menu, the user can select a ringing tone menu, as shown in block 320 of FIG. 5 and FIG. 6A. Then, from the ringing tone menu, the user can select an event according to event type (e.g., incoming call, page, sort message, etc.) or the identifiable source of the event (e.g., an entry in the directory, a member of a caller group, an incoming call having predefined caller identification information, etc.), as shown in block 330 of FIG. 5 and FIG. 6B. In this regard, if the user selects an identifiable source that will be identified based upon an entry in the directory or a member of a caller group, the user can then be presented with the directory from which to select the name or caller group with which the selected set of ringing tones will be associated, as shown in FIG. 6C. If, however, the user selects an identifiable source that will be identified based upon caller identification information, the user can further be presented with an options list from which to select the information with which the selected set of ringing tones will be associated. For example, as shown in FIG. 6D, the user can select an area code, prefix and/or the extension of a telephone number as the caller identification information with which a subsequently selected set of ringing tones will be associated. Depending upon the manner in which the caller identification information is selected, it should be apparent that the selected set of ringing tones can be associated with one specific caller or with a group of callers.

After selecting the event, the user accesses a list of ringing tones stored in memory. The list of ringing tones can be a list of predefined sets of ringing tones, such as the set of ringing tones denominated "Britney," as described above, as shown in block 340 of FIG. 5. Alternatively, a set of ringing tones can be constructed at this time in a similar fashion to that described above, as shown in FIG. 6E. In this regard, the user can select one or more ringing tones from the list of ringing tones stored in memory, as illustrated in block 350 of FIG. 5 and FIG. 4B, to thereby construct a set of ringing tones. As shown in block 360 of FIG. 5, the controller 80 can thereafter save an indication of the set of ringing tones into memory, such as in a preference table associated with the respective event in non-volatile memory 160. After storing the set of ringing tones, the user can construct other sets of ringing tones for associated with other events, as shown in block 370. If the user desires to construct or otherwise modify sets of ringing tones for other event, the user selects another event from the ringing tone menu and thereafter repeats the process in a fashion similar to that described above.

After the ringing tones have been programmed, a ringing tone can be generated by the mobile station 10 in response to reception of events. Thus, the present invention provides a method for generating a ringing tone, from a mobile station. The method will be described in terms of an incoming call, but it should be understood that the event can comprise any of a number of different events.

As an overview, when a calling device, such as a mobile or landline telephone, desires to call the mobile station, the base station 30 acts as an intermediary by sending a call alert to the mobile station via at least one RF channel to thereby alert the mobile station of the attempted call. After alerting the mobile station, the base station waits for a fixed time period, which defines a ringing cycle, to receive a response from the mobile station. The response indicates the mobile station is ready to accept the call. If the mobile station 10 does not respond within the ringing cycle time period, the base station 30 releases the call by terminating the call alert to the mobile station and signaling to the caller that the mobile station is unavailable. During the ringing cycle, the mobile station generates the ringing tone to alert the user of the mobile station of the incoming call, as described below. When a user answers the call or interrupts the call, such as via the user interface, the user interface gives a signal to the controller 80 which, in turn halts the output control signal to thereby stop the ringing tone. If the user decides to answer the incoming call, however, a response is sent from the mobile station to the base station indicating that the call is to be accepted. The base station then sets up a connection on the existing RF channel or establishes a second RF channel where the call will ultimately be connected such that the calling device and mobile station can thereafter communicate with one another.

As stated, when a calling device desires to call the mobile station 10, the base station 30 sends a call alert to the mobile station. Therefore, referring now to FIG. 7, the method of generating the ringing tone generally begins with receiving the call alert, as shown in block 380. As described above, the call alert can include caller identification, such as the identification number and/or name that identify the calling device. However, name information may be unavailable for some incoming calls. Thus, as shown in block 390, from the call alert and/or internal memory, the controller can determine caller identification information regarding the incoming call, including the identification number and/or name. It should be understood, though, that the mobile station need not receive any information regarding the incoming call, particularly if no set of ringing tones has been associated with any portion of the identification number or name.

After the mobile station 10 receives the call alert and captures the information regarding the source of the incoming call, if available, the controller 80 generates an output control signal. To generate the output control signal, the controller first identifies whether the event is directly or indirectly associated with a programmed set of ringing tones. In this regard, the controller can identify whether incoming call events are associated with a programmed set of ringing tones, such as in instances in which the information regarding the incoming call corresponds to an identifiable source, such as an entry, a caller group, an identification number and/or name, that is associated with a programmed set of ringing tones.

At this point it will be understood that if the event (e.g., incoming call) is associated with one set of programmed ringing tones, and the information regarding the incoming call corresponds to one or more identifiable sources that are associated with different sets of programmed ringing tones, the controller 80 will preferably prioritize one of the sets of ringing tones over the other. For example, the controller can generally prioritize the set of ringing tones associated with an identifiable source over that associated with the general type of event (e.g., incoming call) such that the ringing tone will be dictated by the set of ringing tones associated with the identifiable source. Additionally, if neither the event in general nor the identifiable source of the event is associated with a set of ringing tones, a default set of ringing tones can be identified, such as including all of the ringing tones stored in memory.

After the controller 80 identifies whether the event is directly or indirectly associated with a set of ringing tones, the controller can retrieve the respective set of ringing tones from memory, as shown in block 400. From the set of ringing tones, then, the controller chooses one ringing tone, as illustrated in block 410. The controller can choose the ringing tone according to any of a number of predefined selection criteria. In one embodiment, for example, the controller chooses the ringing tone randomly. And in another embodiment, for example, the controller chooses the ringing tone in a sequential manner, as described below.

After the controller 80 has chosen the ringing tone from the respective set of ringing tones, the controller can generate the output control signal based upon the chosen ringing tone, as shown in block 420. Thereafter, once the controller has generated the output control signal, the ringing tone can be generated based upon the output control signal, as illustrated in block 430. In this regard, the controller sends the output control signal to the output reproduction device 210. Based upon the output control signal, the output reproduction device, such as the ringer 95, audibly reproduces the ringing tone to thereby alert the user of the mobile station to the incoming call.

The above method repeats for each event received by the mobile station 10. For each received event, then, the controller 80 retrieves a set of ringing tones and chooses a ringing tone. As such, the ringing tone reproduced by the output reproduction device 210 can change from one event to the next. Advantageously, the ringing tone can change between events based upon the selection criteria by which the controller chooses the ringing tone. For example, the ringing tone changes randomly when the controller relies upon a random selection criteria. And when the controller chooses the ringing tone in a sequential manner, the list of ringing tones in the set of ringing tones are sequentially reproduced in response to the mobile station receiving events.

As described above, the controller 80 retrieves the set of ringing tones and chooses a ringing tone after the mobile station 10 receives the call alert. According to another embodiment, however, the controller pre-chooses a ringing tone before the mobile station receives the call alert of an incoming call. By pre-choosing a ringing tone for each set, the controller can queue the ringing tones for output upon receipt of respective events. According to this embodiment, referring to FIG. 8, the method of generating the ringing tone generally begins with the controller choosing a ringing tone for each set of selected ringing tones associated with respective events, with an indication of the choices stored in memory, such as in the preference table along with the respective sets of ringing tones, as shown in block 440.

At some time subsequent to the controller 80 choosing the sets of ringing tones for the different events, the mobile station 10 receives the call alert, as shown in block 450. As before, from the call alert and/or internal memory, the controller can determine the type of event and, in some embodiments, an identification of the source, such as from caller identification information regarding the incoming call, including the identification number and/or name, as illustrated in block 460. Also, as before, the controller can then identify whether the incoming call is associated with a set of ringing tones, either directly or indirectly. The controller can then retrieve the chosen ringing tone of the respective set of ringing tones from memory, as shown in block 470.

After the controller 80 retrieves the ringing tone for the respective set of ringing tones, the controller can generate the output control signal based upon the chosen ringing tone, as shown in block 480. Thereafter, as before, the controller sends the output control signal to the output reproduction device 210, which generates the ringing tone based upon the output control signal, as illustrated in block 490. And based upon the output control signal, the output reproduction device, such as the ringer 95, audibly reproduces the ringing tone to thereby alert the user of the mobile station to the incoming call.

After the controller 80 generates the output control signal, the controller retrieves the ringing tone set that includes the respective chosen ringing tone, as shown in block 500. And from the set of ringing tones, the controller chooses another ringing tone according to the predefined selection criteria. An indication of the choice of the other ringing tone can then be stored in memory, such as by writing over the indication of the previously chosen ringing tone in the preference table, as illustrated in block 510. Thus, the controller can queue another ringing tone for a subsequent event. With each subsequent event, then, the above method repeats beginning with reception of the call alert.

Therefore, the terminal and method of the present invention choose a ringing tone from sets of ringing tones and thereafter generate the ringing tone in response to the terminal receiving an event associated with the at least one set of ringing tones including the chosen ringing tone. As such, a wide variety of different ringing tones can be generated for output in response to different events without manual intervention from a user to change the ringing tone before receipt of each event. In this regard, the user can hear different ringing tones and avoid becoming somewhat tired of listening to one selected ringing tone.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A terminal adapted to communicate via a communications system, wherein the terminal comprises:

a memory capable of storing a plurality of ringing tones, wherein the plurality of ringing tones includes at least one set of at least two ringing tones, and wherein the at least one set of ringing tones is associated with at least one event; and a controller capable of choosing a ringing tone from the at least one set of ringing tones, wherein said controller chooses the ringing tone based upon a predefined selection criteria, wherein said controller is capable of generating signals directed to an output reproduction device that is capable of reproducing the chosen ringing tone in response to the terminal receiving an event associated with the at least one set of ringing tones including the chosen ringing tone, and wherein said controller is capable of choosing another ringing tone from the at least one set of ringing tones after the output reproduction device reproduces the ringing tone that was previously chosen by said controller.

2. A terminal according to claim 1, wherein the other ringing tone is different from the ringing tone that was previously chosen by said controller.

3. A terminal according to claim 1, wherein the terminal is capable of receiving another event, and wherein said controller is capable of generating signals directed to the output reproduction device in response to the terminal receiving the other event such that the output reproduction device is capable of reproducing the other ringing tone.

4. A terminal adapted to communicate via a communications system, wherein the terminal comprises:

a memory capable of storing a plurality of tinging tones, wherein the plurality of ringing tones includes at least one set of at least two ringing tones, wherein the at least one set of tinging tones is associated with at least one event, and wherein at least one of the at least one event is one originating with at least one identifiable source; and a controller capable of choosing a ringing tone from the at least one set of ringing tones, wherein said controller chooses the ringing tone based upon a predefined selection criteria, wherein said controller is capable of generating signals directed to an output reproduction device that is capable of reproducing the chosen ringing tone in response to the terminal receiving an event associated with the at least one set of ringing tones including the chosen ringing tone, wherein said controller is capable of determining information regarding the event, and wherein said controller is capable of generating signals directed to the output reproduction device that is capable of reproducing the chosen ringing tone in response to the terminal receiving the event originating with the at least one identifiable source as determined from information regarding the event.

5. A method of reproducing a ringing tone of a terminal adapted to communicate via a communications system, wherein the method comprises:

choosing a ringing tone from at least one set of ringing tones based upon a predefined selection criteria, wherein the at least one set of ringing tones includes at least two ringing tones, and wherein the at least one set of ringing tones is associated with at least one event;

reproducing the chosen ringing tone in response to receiving an event associated with the at least one set of ringing tones including the chosen ringing tone; and choosing another ringing tone from the at least one set of ringing tones, wherein choosing another ringing tone occurs after reproducing the ringing tone that was previously chosen.

6. A method according to claim 5, wherein choosing another ringing tone comprises choosing a ringing tone different from the ringing tone that was previously chosen.

7. A method according to claim 5 further comprising receiving another event and thereafter generating the other ringing tone in response to receiving the other event.

8. A method of reproducing a ringing tone of a terminal adapted to communicate via a communications system, wherein the method comprises:

choosing a ringing tone from at least one set of ringing tones based upon a predefined selection criteria, wherein the at least one set of ringing tones includes at least two ringing tones, wherein the at least one set of ringing tones is associated with at least one event, and wherein the at least one of the at least one event is one originating with at least one identifiable source; and reproducing the chosen ringing tone in response to receiving an event associated with the at least one set of ringing tones including the chosen ringing tone, wherein reproducing the chosen ringing tone comprises reproducing the chosen ringing tone in response to receiving the event originating with the at least one identifiable source as determined from information regarding the event.

9. A terminal adapted to communicate via a communications system, wherein the terminal comprises:

a memory capable of storing a plurality of ringing tones, wherein the plurality of ringing tones includes at least one set of at least two ringing tones;

a controller capable of choosing a ringing tone from at least one set of ringing tones in response to the terminal receiving an event, wherein the ringing tone is chosen based upon a predefined selection criteria, and wherein said controller is capable of generating signals directed to an output reproduction device that is capable of reproducing the chosen ringing tone; and wherein the terminal is capable of receiving another event, wherein said controller is capable of choosing another ringing tone from the at least one set of ringing tones in response to receiving the other event, and wherein said controller is capable of generating signals directed to the output reproduction device that is capable of reproducing the other ringing tone.

10. A terminal according to claim 9, wherein the other ringing tone is different from the ringing tone previously chosen by said controller.

11. A terminal according to claim 9, wherein the at least one set of ringing tones is associated with an event originating with at least one identifiable source, wherein said controller is capable of determining information regarding the event before choosing a ringing tone, wherein choosing a ringing tone comprises choosing a ringing tone from the at least one set of ringing tones in response to the terminal receiving the event originating with the at least one identifiable source as determined from the information regarding the event.

12. A method of reproducing a ringing tone of a terminal adapted to communicate via a communications system, wherein the method comprises:

choosing a ringing tone from at least one set of ringing tones based upon a random selection criteria, wherein the at least one set of ringing tones includes at least two ringing tones from a plurality of ringing tones, and wherein choosing a ringing tone comprises choosing a ringing tone in response to receiving an event;

reproducing the chosen ringing tone; and receiving another event and thereafter choosing another ringing tone from the at least one set of ringing tones in response to receiving the other event, wherein reproducing the ringing tone comprises reproducing the other ringing tone.

13. A method according to claim 12, wherein choosing another ringing tone comprises choosing a ringing tone different from the ringing tone that was previously chosen.

14. A method of reproducing a ringing tone of a terminal adapted to communicate via a communications system, wherein the method comprises:

choosing a ringing tone from at least one set of ringing tones based upon a predefined selection criteria, wherein the at least one set of ringing tones includes at least two ringing tones from a plurality of ringing tones, wherein choosing a ringing tone comprises choosing a ringing tone in response to receiving an event, wherein the event is one originating with at least one identifiable source, and wherein choosing a ringing tone comprises choosing a ringing tone in response to receiving the event originating with the at least one identifiable source as determined from information regarding the event; and reproducing the chosen ringing tone.

* * * * *